United States Patent
Erez et al.

(10) Patent No.: US 11,821,737 B2
(45) Date of Patent: *Nov. 21, 2023

(54) PUBLIC AND ORDERED TRANSPORTATION TRIP PLANNING

(71) Applicant: MOOVIT APP GLOBAL LTD, Ness Ziona (IL)

(72) Inventors: Nir Erez, Ness Ziona (IL); Roy Bick, Kfar Saba (IL); Yovav Meydad, Kfar Mordechai (IL)

(73) Assignee: MOOVIT APP GLOBAL LTD, Nes Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,042

(22) Filed: Apr. 26, 2022

(65) Prior Publication Data

US 2022/0252408 A1 Aug. 11, 2022

Related U.S. Application Data (63) Continuation of application No. 16/847,815, filed on Apr. 14, 2020, now Pat. No. 11,313,687, which is a
(Continued)

(51) Int. Cl.
    *G01C 21/34* (2006.01)
    *G01C 21/36* (2006.01)

(52) U.S. Cl.
    CPC ..... *G01C 21/3423* (2013.01); *G01C 21/3676* (2013.01)

(58) Field of Classification Search
    CPC ............ G01C 21/3423; G01C 21/3676; G06Q 10/025
(Continued)

(56) References Cited

U.S. PATENT DOCUMENTS

| 7,627,423 B2 | 12/2009 | Brooks |
| 8,121,780 B2 | 2/2012 | Gerdes et al. |

(Continued)

FOREIGN PATENT DOCUMENTS

| CA | 2664234 | 3/2008 |
| CN | 1295663 | 1/2007 |

(Continued)

OTHER PUBLICATIONS

Trip2go App. Website: http://www.trip2go.org/web/using-mobile. php. First accessed on Dec. 30, 2014.
(Continued)

*Primary Examiner* — Muhammad Shafi
(74) *Attorney, Agent, or Firm* — A.C. Entis-IP Ltd; Allan C. Entis (57) ABSTRACT

A method carried out by a computer for coordinating a route comprising a public transportation leg using a vehicle operated by a public transportation service and characterized by an estimated arrival time; and a subsequent ordered transportation leg using a vehicle operated by an ordered transportation service, the method comprising: transmitting to the ordered transportation service an order for a vehicle to provide the ordered transportation leg, the order being characterized by an estimated departure time; tracking real-time progress of the user along the public transportation leg; responsive to the tracking detecting a delay in the public transportation leg, determining a later departure time for the ordered transportation leg; transmitting to the ordered transportation service a revised order for the ordered transportation leg comprising the later departure time; and sending to the mobile communication device a rescheduling notification comprising the later departure time.

11 Claims, 5 Drawing Sheets

Related U.S. Application Data continuation of application No. 14/614,445, filed on Feb. 5, 2015, now Pat. No. 10,620,010.

(58) Field of Classification Search
USPC .......................................................... 701/483
See application file for complete search history.

(56) References Cited

U.S. PATENT DOCUMENTS

| | | | |
|---|---|---|---|
| 8,649,967 B1 | 2/2014 | Daniel | |
| 8,799,038 B2 | 8/2014 | Chen et al. | |
| 9,799,222 B2 | 10/2017 | Bick et al. | |
| 2004/0158483 A1* | 8/2004 | Lecouturier | G06Q 10/025 705/6 |
| 2005/0216412 A1 | 9/2005 | Kalinichenko et al. | |
| 2006/0158330 A1 | 7/2006 | Gueziec | |
| 2008/0014908 A1 | 1/2008 | Vasant | |
| 2008/0036653 A1 | 2/2008 | Hutson | |
| 2008/0054072 A1 | 3/2008 | Katragadda et al. | |
| 2008/0059061 A1 | 3/2008 | Lee | |
| 2008/0195428 A1 | 8/2008 | O'Sullivan | |
| 2008/0319644 A1 | 12/2008 | Zehler | |
| 2009/0157312 A1 | 6/2009 | Black et al. | |
| 2009/0157613 A1 | 6/2009 | Strohmenger et al. | |
| 2009/0182498 A1 | 7/2009 | Seymour | |
| 2010/0088026 A1 | 4/2010 | Manolescu | |
| 2010/0125410 A1 | 5/2010 | Hicks | |
| 2010/0268450 A1* | 10/2010 | Evanitsky | G01C 21/3423 701/533 |
| 2011/0046878 A1 | 2/2011 | Sung et al. | |
| 2011/0257877 A1 | 10/2011 | Liu et al. | |
| 2012/0192247 A1 | 7/2012 | Oliver et al. | |
| 2012/0232776 A1 | 9/2012 | Gontmakher et al. | |
| 2012/0233246 A1 | 9/2012 | Guemez | |
| 2013/0041941 A1 | 2/2013 | Tomasic et al. | |
| 2013/0184982 A1 | 7/2013 | DeLuca et al. | |
| 2014/0012634 A1 | 1/2014 | Pearlman et al. | |
| 2014/0203951 A1 | 7/2014 | Moon et al. | |
| 2014/0257697 A1* | 9/2014 | Gishen | G01C 21/00 701/537 |
| 2014/0257949 A1 | 9/2014 | Gishem et al. | |
| 2014/0278105 A1 | 9/2014 | Canfield | |
| 2014/0350979 A1* | 11/2014 | Paetzold | G06Q 20/00 705/6 |
| 2015/0095198 A1 | 4/2015 | Eramian | |
| 2015/0350840 A1* | 12/2015 | Pham | H04W 4/027 455/456.1 |
| 2016/0055256 A1 | 2/2016 | Look et al. | |
| 2016/0202079 A1* | 7/2016 | Konig | G08G 1/096833 701/533 |

FOREIGN PATENT DOCUMENTS

| | | |
|---|---|---|
| CN | 101832778 | 9/2010 |
| CN | 102484767 | 5/2012 |
| CN | 103531025 | 1/2014 |
| EP | 2708850 | 3/2014 |
| EP | 12306109 | 3/2014 |
| GB | 2378560 | 2/2003 |
| JP | 2003281174 | 10/2003 |
| JP | 2003344071 | 12/2003 |
| JP | 2005234918 | 9/2005 |
| JP | 2010185713 | 8/2010 |
| KR | 1020100089218 | 8/2010 |
| KR | 1020110020175 | 3/2011 |
| MX | 2010003223 | 9/2011 |
| WO | 200216457 | 2/2002 |
| WO | 2008034264 | 3/2008 |
| WO | 2011021899 | 2/2011 |
| WO | 2011127363 | 10/2011 |
| WO | 2012034083 | 3/2012 |

OTHER PUBLICATIONS

International Search Report dated May 12, 2016 for corresponding PCT application No. PCT/IB2016/050568, filed Feb. 4, 2016.

International Search Report and Written Opinion dated Apr. 3, 2014 for International Patent Application No. PCT/IL2013/050756 filed Sep. 8, 2013.

Office Action dated May 6, 2015 for Israeli Patent Application No. 237577 filed Mar. 4, 2015.

Office Action dated May 11, 2015 for Colombian Patent Application No. 15051159, filed Mar. 6, 2015.

European Supplemental Search Report dated Jul. 8, 2015 for European Patent Application No. 13835985.6 filed Mar. 3, 2015.

Office Action dated Mar. 19, 2015 for Canadian Patent Application No. 2884372 filed Mar. 5, 2015.

Office Action dated Oct. 23, 2015 for Canadian Patent Application No. 2884372 filed Mar. 5, 2015.

Office Action dated Aug. 10, 2015 for Korean Patent Application No. 10-2015-7006052 filed Mar. 9, 2015.

Office Action dated Oct. 10, 2015 for Chinese Patent Application No. 2013800468392 filed Mar. 9, 2015.

Office Action dated Dec. 15, 2015 for Israeli Patent Application No. 237577 filed Mar. 4, 2015.

Office Action dated Sep. 15, 2015 for Japanese Patent Application No. 2015-530550 filed Mar. 5, 2015.

Office Action dated Mar. 15, 2016 for European Patent Application No. 13835985.6 filed Mar. 3, 2015.

Office Action dated Mar. 31, 2016 for Korean Patent Application No. 10-2015-7006052 filed Mar. 9, 2015.

Office Action dated Apr. 12, 2016 for Japanese Patent Application No. 2015-530550 filed Mar. 5, 2015.

Office Action dated Jun. 1, 2016 for Canadian Patent Application No. 2884372 filed Mar. 5, 2015.

Office Action dated Jun. 6, 2016 for Chilean Patent Application No. 0575-2015 filed Mar. 6, 2015.

Office Action dated Jun. 21, 2016 for Mexican Patent Application No. MX/a/2015/002857 filed Mar. 5, 2015.

Office Action dated Sep. 8, 2016 for Colombian Patent Application No. 15051159, filed Mar. 6, 2015.

Office Action dated Dec. 28, 2016 for Canadian Patent Application No. 2884372 filed Mar. 5, 2015.

Office Action dated Feb. 4, 2017 for Chinese Patent Application No. 2013800468392 filed Mar. 9, 2015.

Office Action dated Jan. 25, 2017 for Chilean Patent Application No. 0575-2015 filed Mar. 6, 2015.

Office Action dated Mar. 27, 2017 for Australian Patent Application No. 2013311211 filed Mar. 6, 2015.

Hoffman, Tzahi, Globes English Newspaper Article, "Public transport trip planning Co. Tranzmate raises $3.5 m", Apr. 18, 2012; Retrieved from the Internet on Jul. 8, 2015: http://www.globes.co.il/en/article-1000742178.

Rafaeli, Talia, "Tranzmate Press Release", May 16, 2012; Retrieved from the Internet on Jul. 8, 2015: http://www.gemini.co.il/media/11373/press_release_english.pdf.

Summons to Attend Oral Proceedings dated Feb. 26, 2019 for corresponding European Application No. 16709134.7 filed Aug. 4, 2017.

European Communication prior to Oral Hearing, received on Jun. 20, 2019 via email from European Examiner A. Economou (actual communication dated Jun. 27, 2019) for corresponding European Application No. 16709134.7 filed Aug. 4, 2017.

European Communication dated Jul. 17, 2019: Decision to Refuse European Application (for corresponding European Application No. 16709134.7 filed Aug. 4, 2017).

European Search Report dated Dec. 10, 2019 for European Application 19200118.8 filed on Sep. 27, 2019.

Office Action dated Sep. 15, 2016 for U.S. Appl. No. 14/614,445 (now U.S. Pat. No. 10620010) filed Feb. 5, 2015.

Office Action dated Mar. 17, 2017 for U.S. Appl. No. 14/614,445 (now U.S. Pat. No. 10620010) filed Feb. 5, 2015.

Office Action dated Mar. 9, 2018 for U.S. Appl. No. 14/614,445 (now U.S. Pat. No. 10620010) filed Feb. 5, 2015.

Office Action dated Sep. 26, 2019 for U.S. Appl. No. 14/614,445 (now U.S. Pat. No. 10620010) filed Feb. 5, 2015.

(56) References Cited

OTHER PUBLICATIONS

Office Action dated Mar. 19, 2020 for Chinese Patent Application No. 2016800191472 filed Sep. 27, 2017.
European Communication dated Sep. 7, 2022 for European Application 19200118.8 filed on Sep. 27, 2019.
Office Action dated Dec. 30, 2020 for U.S. Appl. No. 14/847,815 (now U.S. Pat. No. 11,313,687) filed Apr. 14, 2020.
Final Office Action dated Jun. 17, 2021 for U.S. Appl. No. 14/847,815 (now U.S. Pat. No. 11,313,687) filed Apr. 14, 2020.
Notice of Allowance dated Dec. 8, 2021 for U.S. Appl. No. 14/847,815 (now U.S. Pat. No. 11,313,687) filed Apr. 14, 2020.
Office Action dated Oct. 11, 2018 for U.S. Appl. No. 14/614,445 (now U.S. Pat. No. 10620010) filed Feb. 5, 2015.
Brazillian Decision Dated Nov. 7, 2022 in the corresponding Brazilian Patent Applicaion #BR 112017016738-7 fied Aug. 4, 2017.
Brazilian Office Action dated Jun. 5, 2022 for application No. 11 2017 016738 7 filed Aug. 4, 2017.

\* cited by examiner

PUBLIC AND ORDERED TRANSPORTATION TRIP PLANNING

RELATED APPLICATIONS

The present application is a continuation of co-pending U.S. patent application Ser. No. 16/847,815, filed on Apr. 14, 2020 and to be issued as U.S. Pat. No. 11,313,687 on Apr. 26, 2022, which is a continuation of U.S. patent application Ser. No. 14/614,445 filed on Feb. 5, 2015, now U.S. Pat. No. 10,620,010 issued on Apr. 14, 2020, the disclosures of which are incorporated herein by reference.

TECHNICAL FIELD

Embodiments of the invention relate to trip planning, preferably incorporating public transportation and ordered transportation services.

BACKGROUND

Various navigation systems for providing a user with geographic information are known in the art and are widely used. By way of example, a car may be equipped with a navigation system to determine a current geographic location of the car and/or to guide the car from a point of origin to a destination by providing its driver with appropriate instructions as a driver traverses the route. Furthermore, navigation systems relating to public transportation systems that run according to predetermined schedules exist in the art. For example, PCT Application Publication, WO 2014/037949, incorporated by reference, relates to public transportation navigation systems configured to allow users to plan trips and utilize public transportation efficiently.

SUMMARY

Embodiments of the invention provide a trip planning system configured to provide a user a multi-modal transportation route plans that incorporate public transportation systems and ordered transportation services, which do not run according to a set schedule, but are ordered by a user in advance of use of the service. Ordered transportation services, according to embodiments of the invention may include taxi-cab services, hired car services and limousine services. A user of the system, which may be referred to hereinafter as the public/ordered trip system (POTS), may choose to travel on a route that incorporates public transportation and an ordered transportation service, and may place an order to an operator of the ordered transportation service through the trip planning system, obviating the need to directly communicate with operator.

Ordered transportation services, according to an embodiment of the invention, are transportation services which do not travel according to set schedules and require ordering in advance. Exemplary ordered transportation services according to embodiments of the invention may include short-term rental cars.

Further embodiments of the invention relate to methods for trip planning comprising providing a user with information regarding to a trip plan combining real time and/or static public transportation data with real time ordered transportation service data. The methods may further comprise providing a user with an ability to order an ordered transportation service while performing trip planning.

In locations having developed public transportation systems, many passenger trips are most efficient and cost-effective if they combine a combination of public and ordered transportation systems. Currently, no systems exist which allow users to plan routes including multi-modal routes that include both public and ordered transportation services. Embodiments of the invention allow passengers to plan efficient and cost-effective multi-modal trips.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

DETAILED DESCRIPTION

Figure 1:
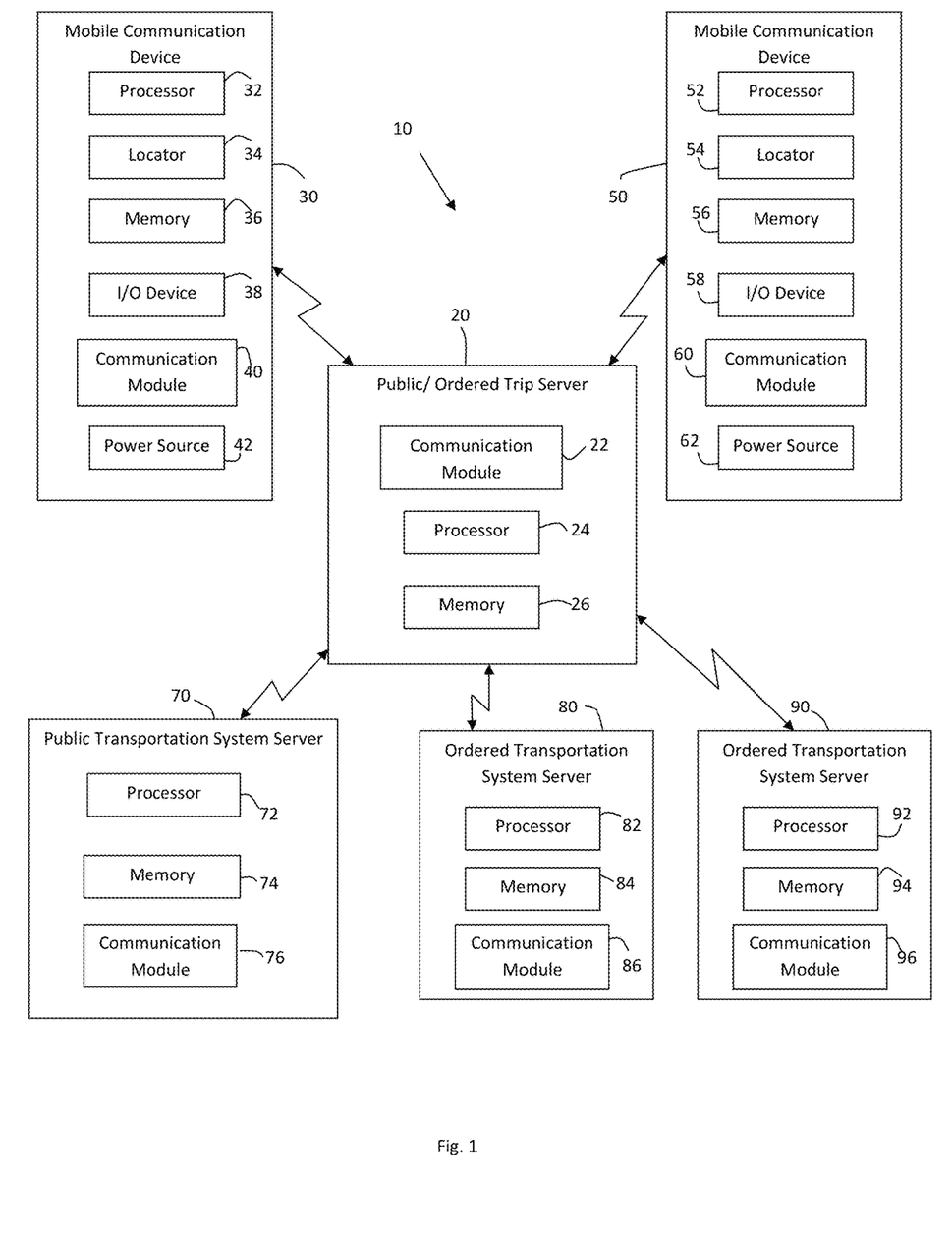
FIG. 1 depicts a block diagram showing a public/ordered trip system (POTS) according to an embodiment of the invention.

Reference is now made to FIG. 1, which depicts a block diagram showing a public/ordered trip system (POTS) 10 according to an embodiment of the invention. POTS 10 comprises a public/ordered trip server 20, a mobile communication device 30, a mobile communication device 50, a public transportation system server 70, an ordered transportation system server 80, and an ordered transportation system server 90.

Public/Ordered Trip Server 20 comprises a communication module 22, a processor 24 and a memory 26.

Mobile communication device 30 comprises a processor 32, a locator 34, a memory 36, an I/O (input/output) device 38, a communication module 40 and a power source 42.

Mobile communication device 50 comprises a processor 52, a locator 54, a memory 56, an I/O device 58, a communication module 60 and a power source 62.

Public transportation system server 70 comprises a processor 72, a memory 74 and a communication module 76.

Ordered Transportation System Server 80 comprises a processor 82, a memory 84 and a communication module 86. Ordered Transportation System Server 90 comprises a processor 92, a memory 94 and a communication module 96.

According to an embodiment of the invention, a server or computing device may be a smartphone, a desktop computer, a laptop computer, a phablet, a tablet, a smartwatch, a server. Optionally, a computer device or server may be a "distributed system" with code and hardware components located in different, physically distinct locations.

Public/Ordered Trip Server 20 is configured to receive and transmit data from at least one mobile communication device 30/50; at least one public transportation system server 70 and at least one ordered transportation system server 80/90. Data communication may be through wired or wireless communication routes. According to an embodiment of the invention, data communication may be through cellular data transmission, Wi-Fi network, cloud-computing, or through the World Wide Web or Internet.

Mobile communication devices 30 and 50 may be selected from the group of mobile (cellular) phones, personal digital assistants, phablets, tablets, and smartphones. Mobile communication devices used in conjunction with POTS 10 may use operating systems such as Android, Microsoft Windows® OS, Mac® OS X or Apple® iOS. According to an embodiment of the invention, I/O device 38 and 58 comprised in mobile communication devices may comprise a touch-screen.

Locators 34 and 54 may be configured to determine the geographic location of mobile communication device 30 and 50 respectively. Locators 34 and 54 may determine geographic location based on, by way of example, triangulation positioning using cellular signals from cellular antennas and/or based on Global Positioning System (GPS) technology. Locations of mobile communication devices 30 and 50 may be used by public/ordered trip server to calculate current location of, for example, public transportation vehicles.

Software may be stored on memory 36 and 56, including an application (app) having a graphical user interface and instructions for communication between mobile communication device 30 and 50 via communication modules 40 and 60 respectively, and public/ordered trip server 20 via its communication module 22. Data transferred between mobile communication devices 30 and/or 50, and public/ordered trip server 20 may comprise, as non-limiting examples, user personal data, user preference data, user location data, destination data, trip instruction data, trip cost data, and financial payment detail data.

Public Transportation System Server 70, may comprise, in memory 74, data regarding public transportation system routes and/or schedules. Public Transportation System Server 70 may comprise data relating to busses, minivans, trams, trolleys, trains, subways, aircrafts, watercrafts (for example, ships, boats or ferries) or cable cars. The data may be static data and/or dynamic data. Static data may comprise data which represents scheduled trips of public transportation, such as scheduled routes, scheduled arrival/departure times and/or scheduled trip duration. The data may be provided by and updated by the operator of the public transportation service. Dynamic data may comprise data based on real-time location. For example, current schedule, as determined by GPS locators fixed in buses or other transportation vehicles may provide dynamic data such as scheduled arrival/departure times and/or scheduled trip duration adjusted relative to position data received by GPS locators. Current schedule may also be determined based on locations of mobile communication devices 30 and/or 50. For example, if a user carrying mobile communication device 50 had traveled using a given route of transportation, at a given time, public transportation system server 70 may sense traffic conditions based on location of mobile communication device 50. Public transportation system server 70 may utilize this information while route planning for user of mobile communication device 30, if he or she travels in the approximate location of the given route of transportation at the given time.

Communication module 76 may be configured to receive data from various public transportation system vehicles and/or servers in order to provide data relating to schedule of the transportation.

Ordered Transportation System Server 80/90 may be configured to communicate, via communication module 86/96 with at least one driver of an ordered transportation system. According to an embodiment of the invention, ordered transportation system server 80/90 communicates with at least one operator of a taxi-cab service, hired car service and/or limousine service. According to an embodiment of the invention, an ordered transportation system server may be a server of a web-based or mobile-telephone-based taxi ordering service, for example, GetTaxi. According to an embodiment of the invention an ordered transportation system server may be a server of a ridesharing service such as Uber, Lyft, Sidecar, EasyTaxi or Hailo. An ordered transportation system server may be located within a taxi-cab and serve primarily the driver of the taxi-cab. Alternatively, the ordered transportation system server may be associated with a taxi dispatcher and serve taxi-cabs associated with the taxi dispatcher's company and/or station.

Communication module 86/96 may be configured to receive queries relating to location, availability, cost, predicted future availability, predicted future cost of taxi-cab service, hired car service, limousine service and/or ridesharing service associated with ordered transportation system server 80/90.

Communication module 86/96 may provide to public/ordered trip server 20, via its communication module 22 information relating to location, availability, cost, predicted future availability, predicted future cost of taxi-cab service, hired car service, limousine service and/or ridesharing service.

Figure 2:
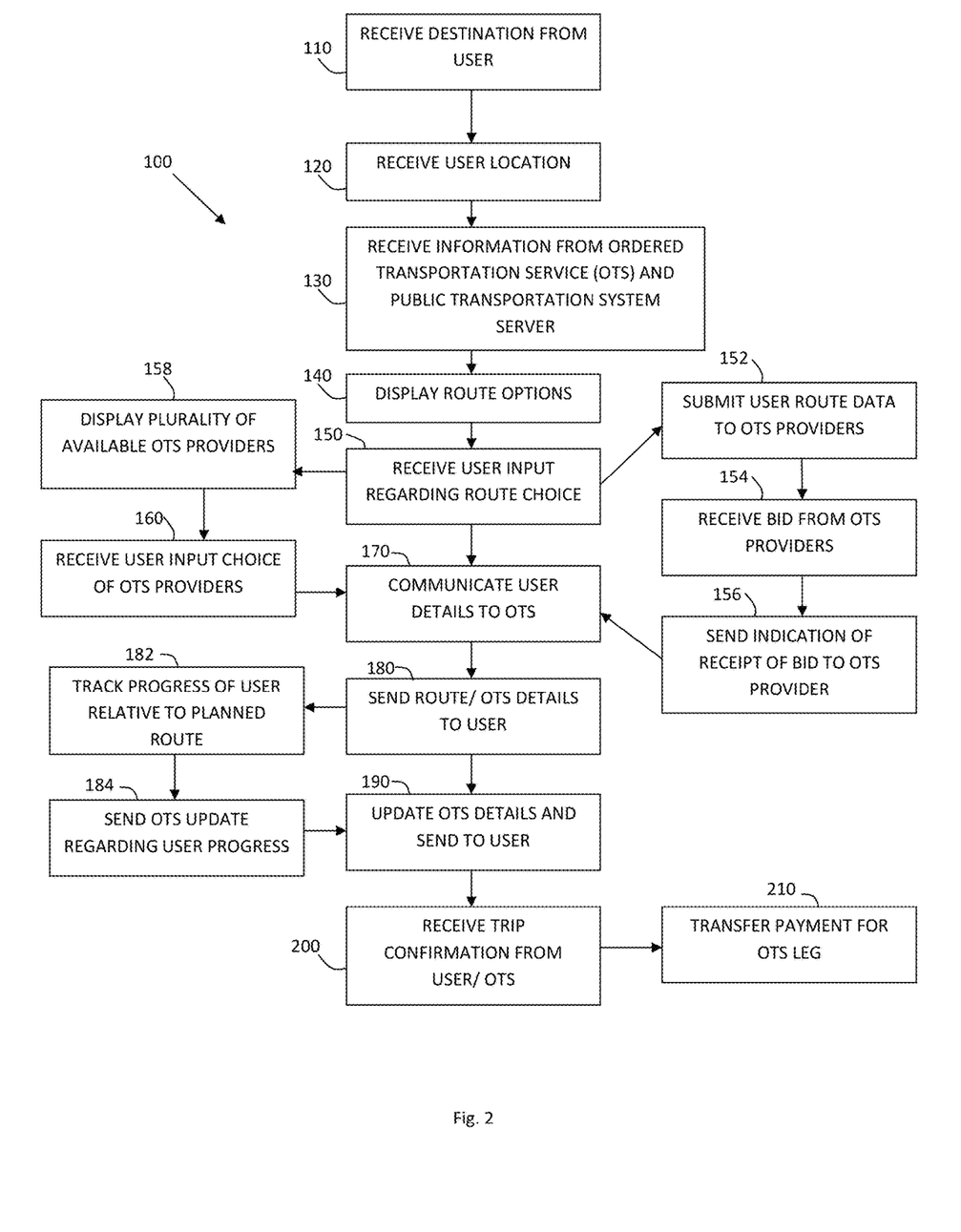
FIG. 2 depicts a flow diagram showing methods of trip planning and coordination according to embodiments of the invention.

Reference is now made to FIG. 2 which depicts a flow diagram relating to method 100 of trip planning and coordination according to embodiments of the invention. Method 100 may be performed using a POTS 10 and/or a public/ordered trip server 20. Method 100 comprises a block 110, comprising receiving a destination of a trip from a user. The user may, via a mobile communication device, enter a destination of intended travel. The user may enter the destination into a mobile application installed on the mobile communication device. The destination may be chosen from a list of previously visited or previously set destinations on the user's mobile communication device.

Method 100 comprises a block 120, comprising receiving data relative to a user location. Data may be received by a public/ordered trip server from a user by receiving locator data, such as GPS data of current location of user's mobile communication device. According to an embodiment, data representative of user's location may be obtained by locating approximate area of user's mobile communication device based on cellular communication antennas detecting signals from the user's mobile communication device. According to an embodiment of the invention, a user may enter into the user's mobile communication device, a location from which he/she intends to start his/her trip to reach a destination. According to an embodiment of the invention, the user may enter his/her location using a computing device which transfers the user's intended start location via the internet to a public/ordered trip server.

Method 100 comprises a block 130, comprising receiving information from an ordered transportation service (OTS) and a public transportation system with respect to user's location, destination and/or locations between user's location and destination. Information may be received, by the public/ordered trip server from one OTS or from multiple OTS and from one public transportation system server or multiple public transportation system servers. Information received from OTS may relate to a future trip which may be ordered through the OTS. The information relating to a future trip may relate to cost of trip, duration of trip, approximate amount of wait-time before initiating the trip, ordered vehicle available to perform the trip, and/or probability of a vehicle being available at the intended start time and location of OTS trip.

In addition to receiving information from OTS, public/ordered trip server may receive information with respect to user's location, destination and/or locations between user's location and destination from a public transportation server system. Public transportation server system information may comprise static data and/or dynamic data.

Method 100 comprises a block 140, comprising displaying suggested route options. According to an embodiment of the invention, a route or a plurality of suggested routes between user's location and destination planned by public/ordered trip server is displayed on a user's mobile communication device. One of the route options may comprise both a public transportation leg or legs and an ordered transportation (such as taxi-cab) leg or legs. Details regarding suggested route options may be displayed in conjunction with the suggested route options. Details regarding suggested route options may include but are not limited to: cost of route, operator details of route, planned time of traversal of route. Operator details of route may relate to public transportation leg, such as bus line number, train line number, or may relate to OTS legs and may comprise taxi-cab company or taxi-cab identifier number. According to an embodiment of the invention, suggested route options may be displayed on a touch-screen of a user's mobile communication device. Route options may be displayed in order from fastest route to slowest route. Route options may be displayed in order from least expensive to most expensive route. A user may choose a preference of order of display according to display by cost or display by speed of route.

With respect to OTS legs, public/ordered trip server may display details regarding OTS legs which are real-time details and/or details regarding OTS legs which are historical details. For example, price of a trip leg may be a historical detail as it may be set by a fixed price guide stored in memory of public/ordered trip server. Availability of an operator may be based on real-time details regarding an OTS leg as it may be based on real time data received from an OTS server and based on current availability of OTS operators at the time of the receipt of the data and/or future availability of OTS operators at the time of the intended trip leg.

According to an embodiment of the invention, availability of an operator may be considered when planning a route for a user. For example, if POTS detects long wait times for OTS in a certain area, POTS may suggest utilization of OTS in a different area having shorter wait times.

According to an embodiment of the invention, POTS may receive input from OTS operators regarding presence of OTS in a given area. POTS may suggest a meeting place between user and OTS operator at a certain distance from the given area to obviate the need for the user to discern between multiple OTS operators located at a given area.

Method 100 comprises a block 150 comprising receiving user input regarding a route choice. Public/ordered trip server may receive an indication of a choice from a user relating to choice of one of the suggested route options. For example, a user may choose a route which combines a bus ride with a taxi ride. A user may choose a route by tapping on a displayed route option using a mobile communication device touch-screen.

Upon receipt of user input regarding a route choice comprising an OTS leg, user may be prompted to provide confirmation of ordering the OTS leg. Upon confirmation, user may be prompted to indicate method of payment for OTS service. Alternatively, user preferences for payment may be stored in public/ordered trip server. User payment details, such as credit card details, may be transferred to operator of OTS for payment for OTS service.

Method 100 comprises a block 170 comprising communicating user details to OTS. Once user confirms ordering a trip leg through OTS, user details may be sent to OTS via public/ordered trip server. The details communicated to the OTS may include one or more than one of: user name, user phone number, estimated user pickup time, location of user pickup, user destination via OTS, user trip destination, user origin (from where user trip originated) and user identifier.

According to block 170, a communication channel may be opened between an OTS operator and a user in order to coordinate details regarding the OTS leg. The communication channel may operate to transfer text and/or voice between user and OTS operator, via public/order transportation server. The communication may be through an application on the user's mobile communication device and/or on the OTS operator's mobile communication device.

Method 100 may optionally comprise a block 158, comprising displaying a plurality of available OTS providers. User may choose which OTS best suits his or her route planning OTS providers may be displayed in conjunction with ride cost suggested by each OTS provider. According to an embodiment of the invention, a metric may be displayed in conjunction with each OTS. The metric may be a rating relating to previous services provided by the OTS. The metric may represent quality of service, timeliness, user satisfaction or any indicator. The metric may be a user-generated metric, generated based on previous users' experience with an OTS.

Method 100 may optionally comprise a block 160, comprising receiving a user input choosing one of the available OTS providers. According to an embodiment of the invention, a user may choose via a touch-screen of a mobile communication device, an icon indicating an OTS provider. Upon receipt of user input regarding a choice an OTS provider, user may be prompted to provide confirmation of ordering the OTS. After receiving confirmation, public/ordered trip server may communicate user details to OTS provider according to block 170.

Method 100 may optionally comprise a block 152, comprising submitting a user's route data to a plurality of OTS providers. The user's route data may include estimated user pickup time, location of user pickup, user destination via OTS, user overall route destination. The user's route data may comprise probability data. For example, the user probability of a user actually using an OTS may be calculated by the public/order transportation server based on any of a number of parameters including, but not limited to: distance to OTS leg, user's prior POTS history, user's current location, number of user-initiated route changes prior to OTS leg and time to OTS leg.

Method 100 may comprise a block 154, comprising receiving a bid or bids from a plurality of OTS providers. OTS providers may indicate amount of commission (bid) willing to pay to POTS operator for the right to transport user according to user's planned route OTS leg. OTS providers may set commission based on user's route data received according to block 152. POTS operator may accept the bid from one of the OTS providers, for example from the OTS provider having the highest bid.

Method 100 may comprise a block 156 comprise sending an indication of receipt of a bid to an OTS provider. After indicating receipt of bid, public/ordered trip server may communicate user details to OTS provider according to block 170.

Method 100 may comprise a block 180, comprising sending route details and/or OTS details to the user. Public/ordered trip server may send route details comprising directions regarding ordered OTS. Public/ordered trip server may send OTS details, such as name, identifier, car number, and/or location of OTS operator to the user.

Method 100 may comprise a block 182, comprising tracking user progress relative to planned route. Public/ordered trip server may receive indication of user's progress along the planned route via a locator in the user's mobile communication device. Public/ordered trip server may calculate if user's progress geographically and chronologically matches planned route.

Method 100 may comprise a block 184 comprising sending an update to OTS regarding user progress. Upon calculating difference between user's actual progression along route and user's planned route, public/ordered trip server may notify OTS operator regarding disparity between actual progression and planned route, once disparity reaches a certain predetermined level. For example, if user is on a train that has been delayed, public/ordered trip server may detect, based on locator in user's mobile communication device, user's location. Public/ordered trip server may inform an OTS operator regarding the delay and may send a revised order comprising revised details, for example, revised time of initiation of OTS leg.

Method 100 may comprise a block 190, comprising updating OTS details and sending updated details to user. For example, in case of the aforementioned train delay, OTS may indicate to public/ordered trip server that another driver will be sent instead of the previously planned OTS driver. As a result, OTS will notify public/ordered trip server of updated OTS details and public/ordered trip server will notify user accordingly.

Method 100 may comprise a block 200, comprising receiving OTS leg confirmation from a user and/or OTS. Confirmation may then be sent to public/ordered trip server. A user and/or OTS operator may confirm provision of an OTS transportation leg to the user through a mobile communication device, for example through an application on the user's and/or OTS operator's device.

According to an embodiment of the invention, payment may be made directly from the user to the OTS operator. Optionally, the user and/or OTS operator may indicate to the public/ordered trip server that payment was effected between user and OTS operator.

According to an embodiment of the invention, user may provide a rating of the service provided by the OTS operator, and send the rating to the public/ordered trip server, optionally through an application on the user's mobile communication device.

Method 100 may comprise a block 210, comprising transferring payment for the OTS leg from the user to the OTS operator. The public/ordered trip system may transfer payment from a user to an OTS operator by using a credit or debit card provided by the user. Alternatively, a user may pay for OTS services in advance to the public/ordered trip system, and at the time of the trip, payment may be deducted from the user's account and transferred to the OTS.

Reference is now made to FIGS. 3A-3D, depicting screenshots showing screens of a user's mobile communication device while operating in conjunction with a POTS, according to embodiments of the invention. FIGS. 3A-3D will be explained with reference to the scenarios described in the examples below.

Example 1

A user, Joe, plans to travel, via public and/or ordered transportation between his current location, at the University of California, San Francisco (UCSF), and Notre Dame de Namur University, on Feb. 1, 2015 at 12:30. Joe turns on his mobile communication device which is a touch-screen mobile phone, equipped with GPS capabilities. He initiates a POTS application (app) which had been previously downloaded to his mobile phone. The POTS application recognizes his current location at UCSF via a GPS capability of his mobile phone and queries regarding his intended destination. POTS application provides a list of recent destinations, including "Notre Dame de Namur University", to which Joe had travelled the week before, while using POTS. Alternatively, Joe may enter a destination based on address or other feature of the destination in a text-bar. Joe taps the screen display, indicating that his intended destination is Notre Dame de Namur University. POTS may retrieve trip data relevant to Joe's planned trip from a plurality of public transportation and ordered transportation servers and/or databases. The trip data may be real-time data or historical data.

Figure 3A:
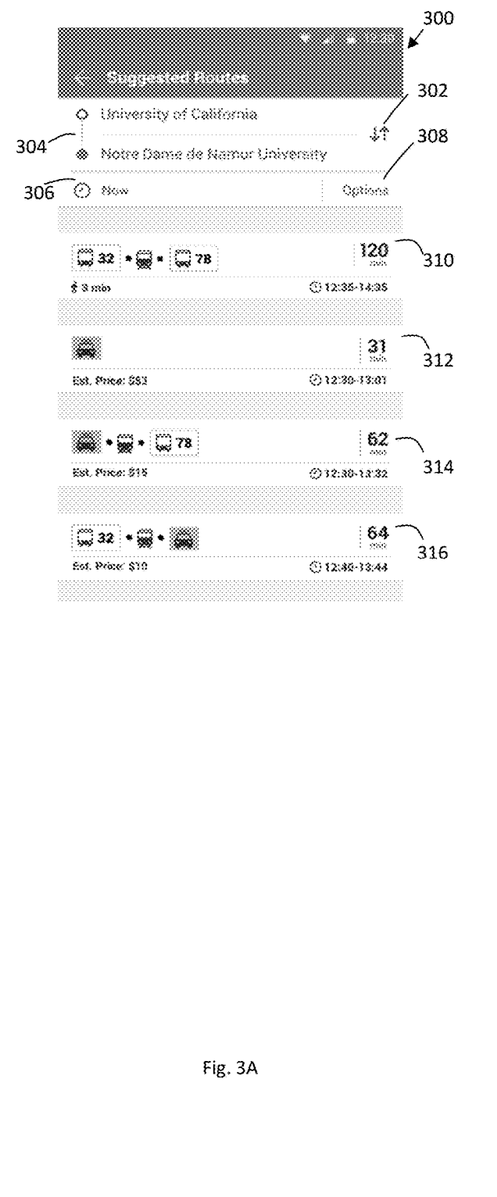
FIGS. 3A-3E depict screenshots showing screens of a user's mobile communication device while operating in conjunction with a POTS, according to embodiments of the invention.

Reference is now made to FIG. 3A, showing a screenshot 300 of Joe's mobile phone POTS app. Screenshot 300 is displayed after Joe makes his choice of destination. Screenshot 300 comprises an intended route 304, a trip reversal icon 302, a trip time indicator 306 and an options icon 308. Screenshot 300 further comprises trip options 310, 312, 314 and 316. User's intended route 304 is displayed, indicating that the route options 310, 312, 314 and 316 provide options to travel from starting point to ending point of intended route 304.

Joe may tap on trip reversal icon 302, for POTS app to display options for a return trip from Notre Dame de Namur University to UCSF.

Trip time indicator 306 indicates that the displayed trip options 310, 312, 314 and 316 are valid for traveling at the current time to Joe's destination. In order for Joe to change the time of departure or time of arrival, Joe may press on the trip time indicator 306. In order to modify trip parameters, Joe may tap on the options icon 308. Trip parameters may allow a user include or exclude certain modes of transportation. Trip parameters may allow a user to set his/her travel preferences, such as less walking, fewer transfers, fastest option and least expensive option.

Trip options 310, 312, 314 and 316 may each comprise icons indicating modes of transportation, estimated price, estimated time and estimated time span of each of the respective trip options.

Trip option 310 is a public transportation-only trip option. Trip option 310 comprises three icons, representing the three methods of transportation to be used, in order of use, if Joe is to choose this trip option. The three icons represent a bus line number 32, a train and bus line number 78. Trip option 310 is scheduled to begin at 12:35 and end at 14:35, and last 120 minutes.

Trip option 312 is an ordered transportation-only trip option. Trip option 312 comprises one icon, representing a taxi service. Trip option 312 is estimated by POTS to cost $53 and to last about 31 minutes, starting at 12:30 and ending at 13:01.

Trip option 314 is a multi-modal transportation trip option that incorporates public and ordered transportation services. Trip option 314 comprises three different icons, representing the three methods of transportation to be used if Joe is to choose this trip option. The three icons represent a taxi, a train and bus line number 78. The scheduled duration of the trip, 62 minutes, is also displayed. Trip option 314 is estimated by POTS to cost $15. The scheduled time of the trip, from 12:30 to 13:32, is also displayed. According to an embodiment of the invention, total cost of trip option may be displayed, optionally comprising the sum of the public and ordered transportation legs.

Trip option 316 is a multi-modal transportation trip option that incorporates public and ordered transportation services. Trip option 316 comprises three different icons, representing the three methods of transportation to be used if Joe is to choose this trip option. The three icons represent a bus line number 32, a train and a taxi. The scheduled duration of the trip, 64 minutes, is also displayed. Trip option 316 is estimated by POTS to cost $10. The scheduled time of the trip, from 12:40 to 13:44, is also displayed.

Joe decides to travel via trip option 316 and taps on the touch screen where trip option 316 is displayed. Joe's mobile phone then changes display to show a screenshot 320 appearing in FIG. 3B.

Figure 3B:
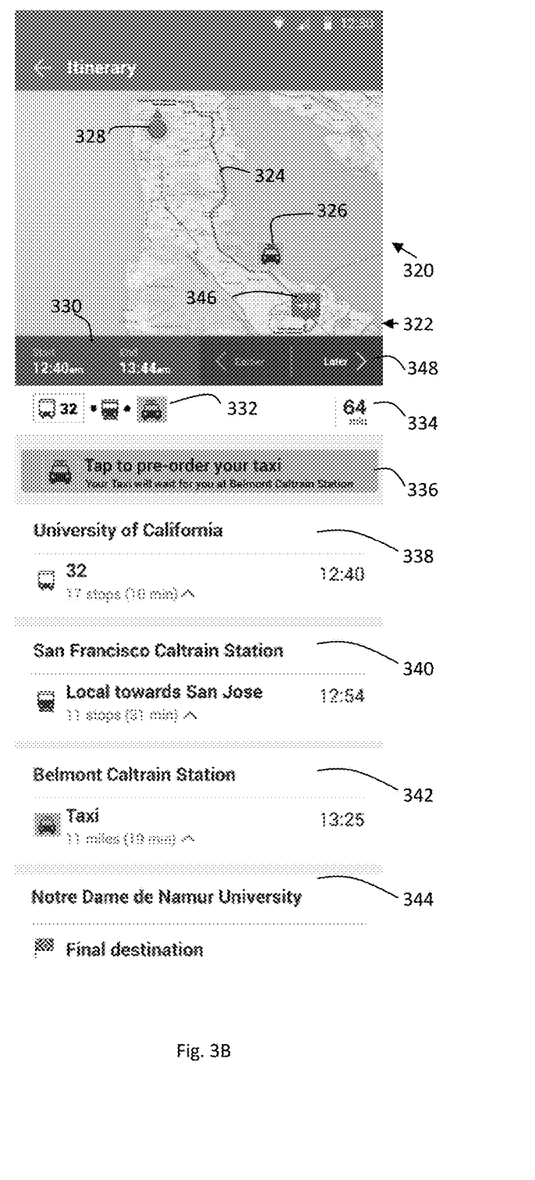

Reference is now made to FIG. 3B, showing a screenshot 320 of Joe's mobile phone POTS app, displaying trip itinerary after deciding on a trip option. Screenshot 320 comprises a map 322, the map comprising a mapped route 324, a current location icon 328, a route finish icon 346 and a route ordered transportation icon 326. Screenshot 320 further comprises route times 330, route mode icons 332 and a route duration 334. Screenshot 320 further comprises a route time modification icon 348. Screenshot 320 further comprises pre-order icon 336.

Screenshot 320 further comprises leg descriptions 338, 340 and 342. Screenshot 320 further comprises a destination 344.

Map 322 shows mapped route 324, a geographical representation on a map of Joe's chosen trip option, based on his choice of trip option 316 (FIG. 3A). Joe's current location, at UCSF, is indicated on map 322 by current location icon 328. Joe's future destination at Notre Dame de Namur University is indicated by route finish icon 346. The point at which Joe's planned route will begin use of OTS, at Belmont Caltrain Station, is represented on map 322 by route ordered transportation icon 326.

Route times 330 indicate the estimated start (12:40) and end (13:44) of Joe's route. Joe may choose the display of his route to change to a later start time by pressing on route time modification icon 348. Route mode icons 332 show the modes of transportation which will be used by Joe according to his route, representing bus line 32 (public transportation), train (public transportation) and taxi (ordered transportation). Estimated time of traversal of the route is displayed at route duration 334.

Route mode icons 332 may be color-coded to match sections of route 324 to which they correspond. For example, the bus icon in route mode icons 332 may be colored blue, corresponding to the section of route 324 traversed by bus that is also colored blue. The train icon in route mode icons 332 may be colored green, corresponding to the section of route 324 traversed by train that is also colored green. The taxi icon in route mode icons 332 may be colored yellow, corresponding to the section of route 324 traversed by taxi that is also colored yellow. Similarly, leg descriptions 338, 340 and 342 may be accordingly color-coded.

Leg description 338 shows the leg starting point, at the University of California, leg starting time, at 12:40 and a bus icon indicating mode of transportation as bus line number 32. Leg description 338 also shows duration of the leg (10 minutes) and number of stops (17) before switching to next leg. Leg description 340 shows the leg starting point, at San Francisco Caltrain Station, leg starting time, at 12:54 and a train icon indicating mode of transportation as local train in the San Jose direction. Leg description 340 also shows the duration of the leg (31 minutes) and number of stops (11) before switching to next leg. Leg description 342 shows the leg starting point, at Belmont Caltrain Station, leg starting time, at 13:25 and a taxi icon indicating mode of transportation. Leg description 340 also shows duration of trip (19 minutes) and number of miles before reaching destination 344.

Pre-order icon 336 is pressed by Joe upon starting his journey in order to confirm ordering of the OTS leg. POTS then notifies OTS operator of confirmation of order, and provides detail regarding Joe's order, including pickup time at 13:25, from Belmont Caltrain Station, for a ride to Notre Dame de Namur University and Joe's phone number.

Figure 3C:
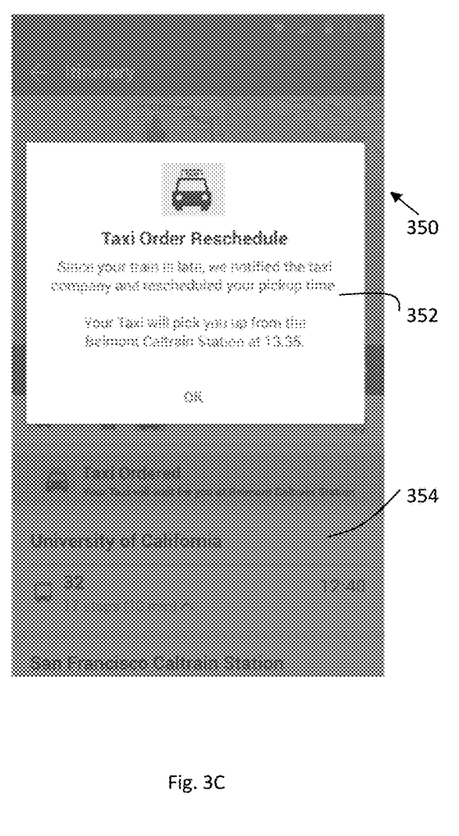
Figure 3D:
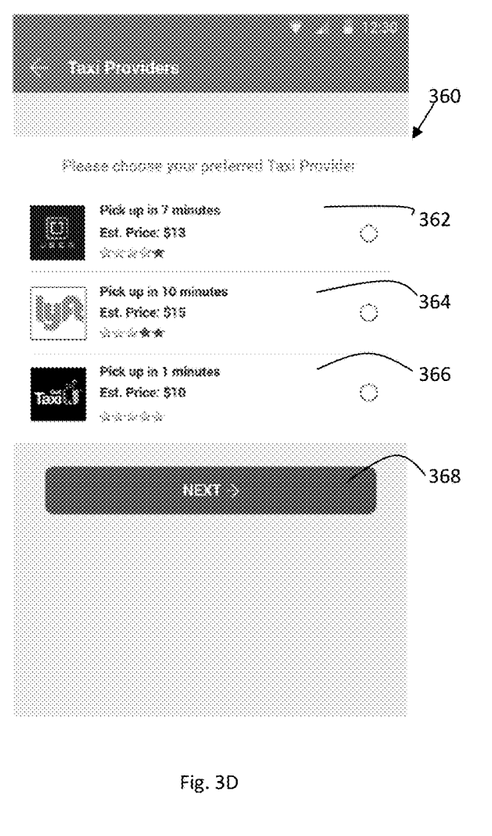
Figure 3E:
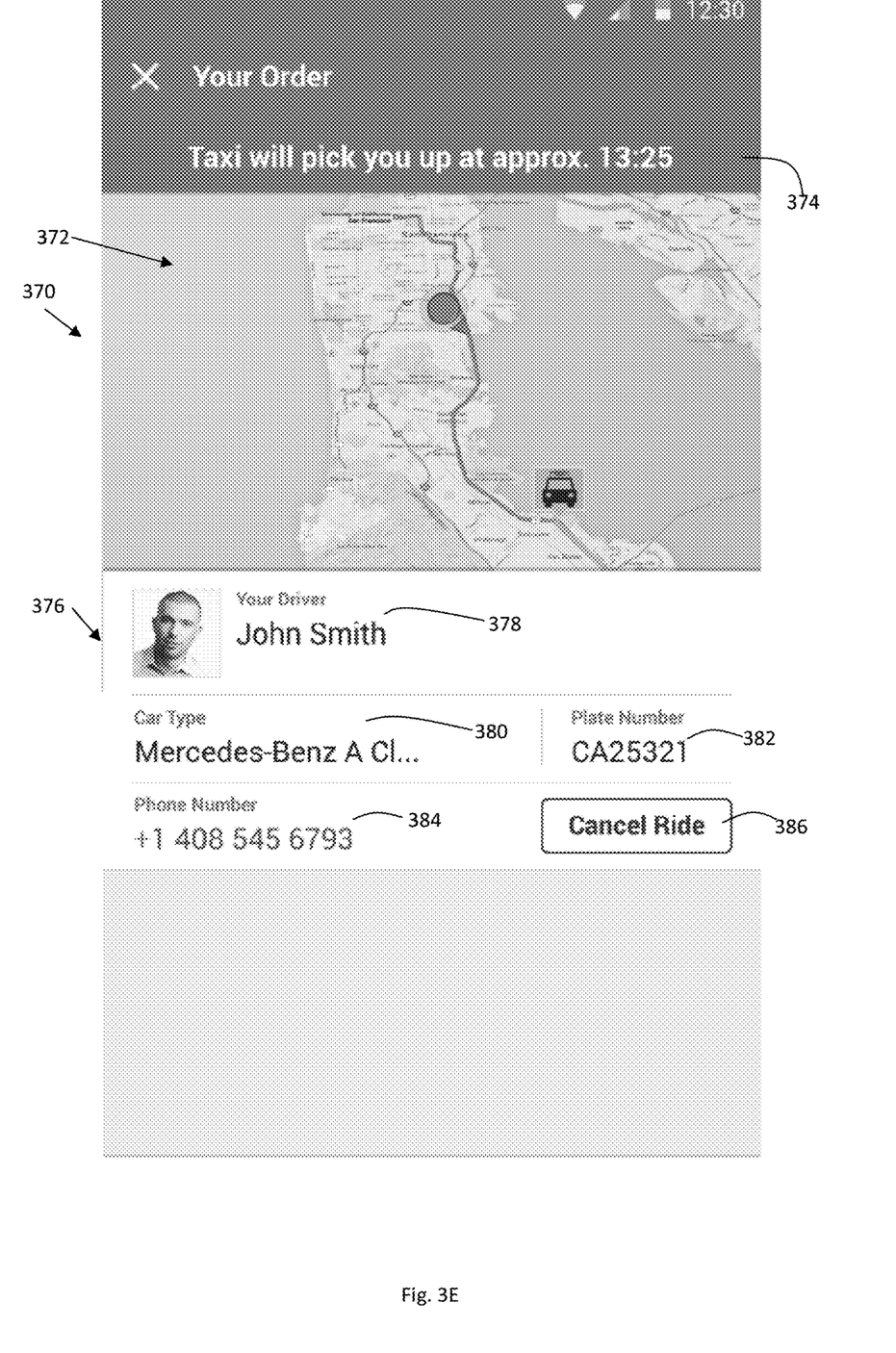

Reference is now made to FIG. 3E. According to an embodiment of the invention, a screenshot 370 is presented upon confirmation of order. Screenshot 370 comprises a map 372 comprising a mapped route, a current location icon, and a route ordered transportation icon. Screenshot 370 further comprises a confirmation window 374 confirming that a taxi will pick Joe up at approximately 13:25. Screenshot 370 further comprises a taxi detail section comprising a driver/operator name 378, a car type 380, a license plate number 382, a driver phone number 384 and a cancellation icon 386. A user may cancel his order by pressing on cancellation icon 386.

According to an embodiment of the invention, upon ordering the OTS leg, Joe is prompted to provide payment details. Joe may be asked to confirm his user identification code and/or phone number and may receive a verification code by SMS to be provided to POTS.

Reference is made to FIG. 3B. According to an embodiment of the invention, POTS may notify an OTS operator regarding the order and inquire from the OTS operator how much advance notice is required for sending an OTS driver to Joe's planned OTS leg initiation. Upon receiving an answer regarding advanced notice, Joe's progress may be tracked by POTS until reaching a point along mapped route 324 which is at the predetermined time interval from the initiation spot of the OTS leg. Once reaching that point, POTS may notify OTS and instruct OTS to send a vehicle for Joe's ordered transportation to begin.

As Joe proceeds along his route, route 324 is updated to indicate updated position of current location icon 328 to show the remaining trip. Optionally, after finishing a leg of the trip, the leg description corresponding to the finished leg may disappear from screenshot 320.

Joe proceeds along the route and arrives at San Francisco Caltrain station at 12:52 and prepares to board the train towards San Jose which was scheduled to leave at 12:54. Instead of leaving at 12:54, the train is delayed and leaves San Francisco Caltrain station at 13:05. POTS is monitoring Joe's progress using GPS in Joe's mobile phone, and at 13:09, detects a disparity between Joe's planned location and Joe's actual location.

Reference is now made to FIG. 3C, showing a screenshot 350 of Joe's mobile phone POTS app. Screenshot 350 shows window 352 shown with itinerary 354 in the background. Window 352 comprises information about a schedule change based on the aforementioned train delay. Window 352 comprises the text, "Taxi Order Reschedule: Since your train is late, we notified the taxi company and rescheduled your pickup time. Your Taxi will pick you up from the Belmont train Station at 13:35." Optionally, a detail or details of the operator of OTS, such as name, identifier, car number, and/or location of OTS operator is sent to Joe.

POTS notifies Joe of the taxi reschedule through the presence of window 352, which may optionally be accompanied by a push notification, causing Joe's mobile phone to vibrate or sound a predetermined sound designated for POTS notifications.

OTS operator, a taxi driver, arrives at Belmont train station at 13:33, at which time he indicates, via his POTS app to send a message to passenger. He writes a text message, via the app, saying, "My taxi is waiting for you. I'm located in the taxi line at the northwest corner of the parking lot. Joe receives the message via his POTS app and reads it. Joe proceeds along the route and arrives at the Belmont train station at 13:34. Upon arriving, Joe proceeds to the location designated in the message received via the POTS, and indicates to the taxi driver that he is the customer who ordered a trip to Notre Dame de Namur University via POTS. The taxi driver proceeds to the destination.

Upon arriving at the destination, Joe indicates, via POTS, that he wishes to pay the taxi fare via his app. Joe indicates the payment method, which is then charged by POTS to Joe's credit card. Joe receives confirmation of payment from POTS. A notification appears on the taxi driver's app confirming that Joe had paid, and indicating the amount paid.

Example 2

As in example 1, Joe uses a POTS to plan the same trip as in example 1. Screenshots 300 and 320 appear as in example 1, and Joe pre-orders a taxi by tapping on pre-order icon 336.

Reference is now made to FIG. 3D. Upon tapping on pre-order icon 336, screenshot 360 in FIG. 3D is displayed. Screenshot 360 comprises OTS provider fields 362, 364 and 366, and continue icon 368.

OTS provider field 362 provides information regarding OTS provider Uber, including rating of OTS provider and estimated cost of OTS leg. OTS provider field 364 provides information regarding OTS provider Lyft, including rating of OTS provider and estimated cost of OTS leg. OTS provider field 366 provides information regarding OTS provider Get-Taxi, including rating of OTS provider and estimated cost of OTS leg.

Joe, after reviewing cost and rating of the OTS providers, chooses Lyft as his OTS provider. Joe's mobile phone then displays an itinerary, as in screenshot 320, with the exception that leg description 342 comprises an icon indicating that Lyft is the OTS provider.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of managing a user trip comprising:
providing a user with a trip plan having a trip route comprising at least one public transportation service (PTS) leg coterminous with an ordered transportation service (OTS) leg at a coterminous leg junction;
communicating with an OTS provider to provide an OTS vehicle to transport the user over the OTS leg and arrive at the coterminous leg junction at a planned time of arrival;
tracking real-time progress of the user along the trip route;
determining a real-time of arrival of the user at the coterminous leg junction responsive to the real-time progress; and
alerting the OTS provider to adjust a provision time of the OTS vehicle for a difference between the planned time of arrival and the real-time of arrival.

2. The method according to claim 1 wherein the OTS leg follows the PTS leg.

3. The method according to claim 1 wherein the OTS leg precedes the PTS leg.

4. The method according to claim 1 wherein alerting the OTS provider comprises alerting the provider at a time determined responsive to a predetermined advance notice period.

5. The method according to claim 4 wherein the advance notice period is received from the OTS provider.

6. The method according to claim 1 wherein alerting the OTS provider comprises alerting the OTS provider responsive to a real time location of the user along the trip route.

7. The method according to claim 1 and comprising updating the user and the OTS to temporal and/or geographical changes in the trip route.

8. The method according to claim 1 wherein providing the trip plan comprises providing the user with a plurality of trip plans from which the user trip plan is selected.

9. The method according to claim 7 wherein providing the trip plan comprises providing a graphical user interface displaying for each of the plurality of trip plans a sequence of icons representing PTS and OTS vehicles used to transport the user over each leg of the trip plan.

10. The method according to claim 8 and comprising for the selected trip plan deleting a vehicle icon associated with a leg responsive to the user completing the leg.

11. A public/ordered trip system comprising:
at least one public transportation service (PTS) server;
at least one ordered transportation service (OTS) server; and a public/ordered trip server;
wherein the PTS, OTS, and public/ordered comprise hardware and software configured to cooperate and provide a user with a trip plan having a trip route according to claim 1.

* * * * *